Nov. 20, 1962 M. A. HALL 3,065,313
PLUS-MINUS TIMER
Filed July 17, 1959 9 Sheets-Sheet 1

INVENTOR.
MITCHELL A. HALL
BY
*Warren Kinney, Jr.*
ATTORNEY.

Nov. 20, 1962    M. A. HALL    3,065,313
PLUS-MINUS TIMER
Filed July 17, 1959    9 Sheets-Sheet 3

INVENTOR.
MITCHELL A. HALL
BY
J. Warren Kinney Jr.
ATTORNEY

Nov. 20, 1962

M. A. HALL 3,065,313

PLUS-MINUS TIMER

Filed July 17, 1959

INVENTOR.
MITCHELL A HALL

BY J. Warren Kinney Jr.
ATTORNEY.

Nov. 20, 1962  M. A. HALL  3,065,313
PLUS-MINUS TIMER
Filed July 17, 1959  9 Sheets-Sheet 5

INVENTOR.
MITCHELL A. HALL
BY
J. Warren Kinney Jr.
ATTORNEY.

INVENTOR.
MITCHELL A. HALL
BY
*J. Warren Kinney Jr.*
ATTORNEY.

INVENTOR.
MITCHELL A. HALL
BY
J. Warren Kinney, Jr.
ATTORNEY.

Nov. 20, 1962     M. A. HALL     3,065,313
PLUS-MINUS TIMER

Filed July 17, 1959     9 Sheets-Sheet 8

INVENTOR.
MITCHELL A. HALL

Nov. 20, 1962 M. A. HALL 3,065,313
PLUS-MINUS TIMER
Filed July 17, 1959 9 Sheets-Sheet 9

INVENTOR.
MITCHELL A. HALL
BY

ATTORNEY

United States Patent Office 3,065,313
Patented Nov. 20, 1962

3,065,313
PLUS-MINUS TIMER
Mitchell A. Hall, 445 Rossford Ave., Fort Thomas, Ky.
Filed July 17, 1959, Ser. No. 827,961
15 Claims. (Cl. 200—35)

This invention relates to a timer mechanism, and more particularly to a time control mechanism which will accommodate and record plus as well as minus accumulations of time for controlling the overall operating characteristics, cycle or period of electrically actuated devices.

The present device is primarily adapted for use in coin-controlled equipment, wherein compression of an electrical circuit to electrical apparatus is controlled by the subject device.

One of the main objects of the present invention is to provide a timer mechanism which will receive a plurality or series of coins each one of which represents payment for a certain, predetermined period of time. If, by way of example, the device is set for a one-hour timing cycle per 25¢, insertion of a quarter would cause the device to close an electrical circuit to an electrically actuated appliance for a period of one hour. Similarly, insertion of a series of quarters would result in the device closing an electrical circuit for a period of time depending upon the number of quarters inserted.

The device, however, has a further important feature which is its ability to accumulate minus time, that is, it will accumulate and indicate to users of the device the amount of time which is owed in order to cause the further insertion of coins to close an electrical circuit to an electrical appliance. The minus time accumulation is important in those instances wherein the timer is associated with electrical devices which are sold on a deferred payment basis wherein the payments may, by way of example, total, say $1.00 a day. So long as the user of the device has inserted sufficient money into the box whereby to prepay for time at the rate of $1.00 a day, the device will provide uninterrupted electrical power to the appliances with which it is associated; however, if the prepayment should lapse for a period of time, the electrical circuit to the appliance will be opened, however the timer mechanism will continue to operate and a negative time accumulation will be accumulated. If, for example, say three days' negative time is accumulated on the device, it would then require the insertion of sufficient coins, in the example $3.00, in order to pay off the negative time recorded on the machine. After the negative time has thus been paid off, further insertion of coins would result in accumulating positive time which would result in the device again closing an electrical circuit to the electrical devices being controlled thereby.

A further object of the invention is to provide a simple yet highly effective control mechanism adapted to accomplish the hereinabove described objects, wherein the device utilizes and may be actuated by any commercially available coin chute.

Another object of the invention is to provide a timer having the hereinabove described characteristics and which is adapted to provide, with a minor adjustment or two, time periods per coin ranging from a period as short as a minute or minutes, up to a matter of hours or even days. In other words, the device may be adjusted by authorized personnel whereby a given coin will be effective to pay for a timing cycle of from one minute to a day or more, thereby greatly enhancing the commercial acceptability of the device.

Still another object of the invention is to provide a timer mechanism which will permit accumulation of both plus and negative or minus time cycles, which time cycles are readily apparent to an observer by means of suitable recording dials which may be easily observed by the users of the device.

A further object of the invention is to provide a timer mechanism having the hereinabove described characteristics with means to prevent the disengagement or breaking of parts by the continuous injection of coins into the timer mechanism, after the device has already accumulated its maximum plus accumulation of time.

These and other objects are attained by the means described herein and as disclosed in the accompanying drawings, in which.

Figure 1:
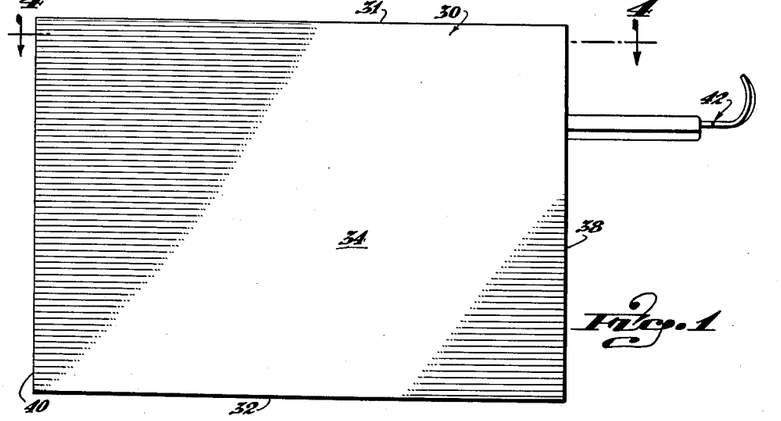
FIG. 1 is a side elevational view of a typical housing within which the timer mechanism of the present invention may be located for mounting.
Figure 2:
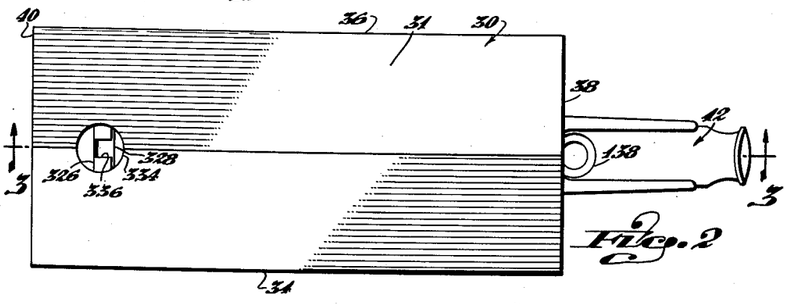
FIG. 2 is a top plan view of FIG. 1.
Figure 3:
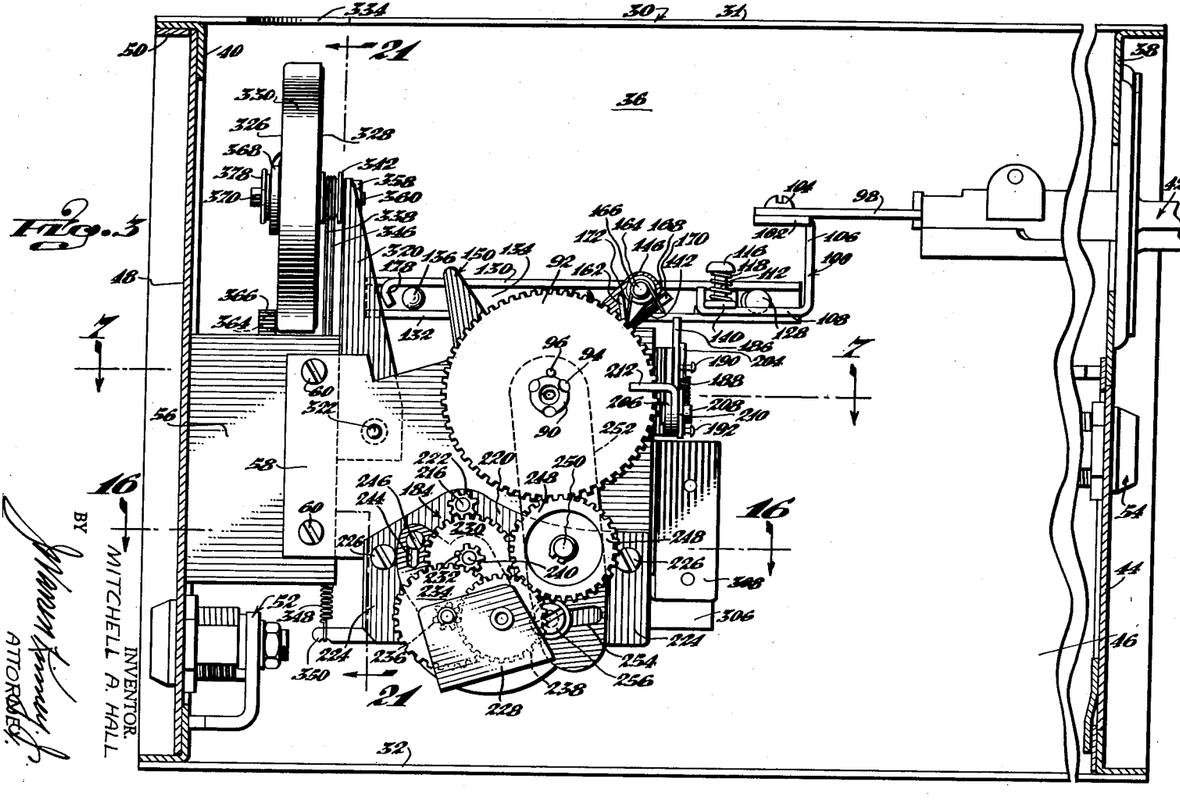
FIG. 3 is a longitudinal sectional view taken on line 3—3 of FIG. 2 and illustrating the plus-minus time control mechanism in elevation.

With particular reference to FIGS. 1 and 2, the plus-minus time control mechanism is enclosed in a housing 30 comprised of top 31, bottom 32, two sides, 34 and 36, and end walls 38 and 40. As best illustrated in FIG. 3, end wall 38 carries a conventional coin slide indicated generally at 42, in addition to being provided with an access door 44 to the coin accumulating compartment 46.

The opposite end wall 40 is provided with a door 48 which carries the entire plus-minus time control mechanism, rigidly fixed to the inside face thereof. The top of door 48 is confined between the outer face of end wall 40 and a cross bar 50. The bottom of door 48 lies against the outer face of end wall 40 and is securely held in place by means of a lock unit indicated generally at 52 similar to the lock unit 54 carried by access door 44. To remove the plus-minus time control mechanism for servicing or adjustment, it is necessary only to unlock the unit 52, swing the door 48 outwardly at the bottom and slide the top out of engagement from between the outer face of end wall 40 and the inner edge of cross bar 50.

Figure 7:
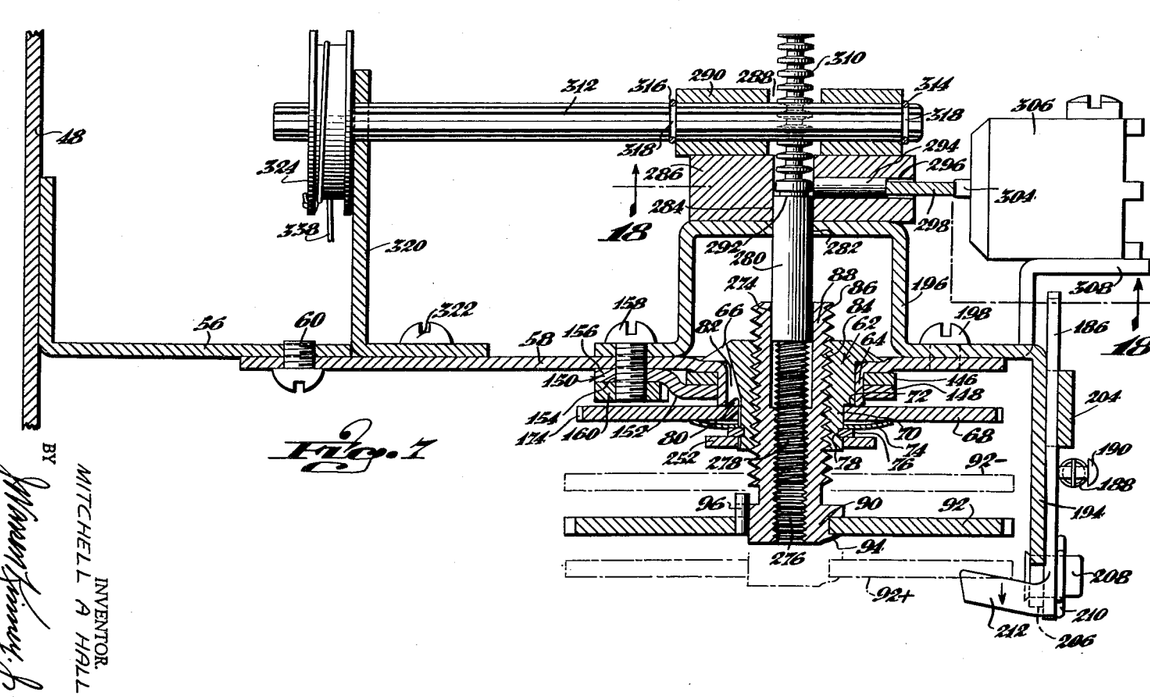
FIG. 7 is a sectional view taken on lines 7—7 of FIG. 3.
Figure 8:
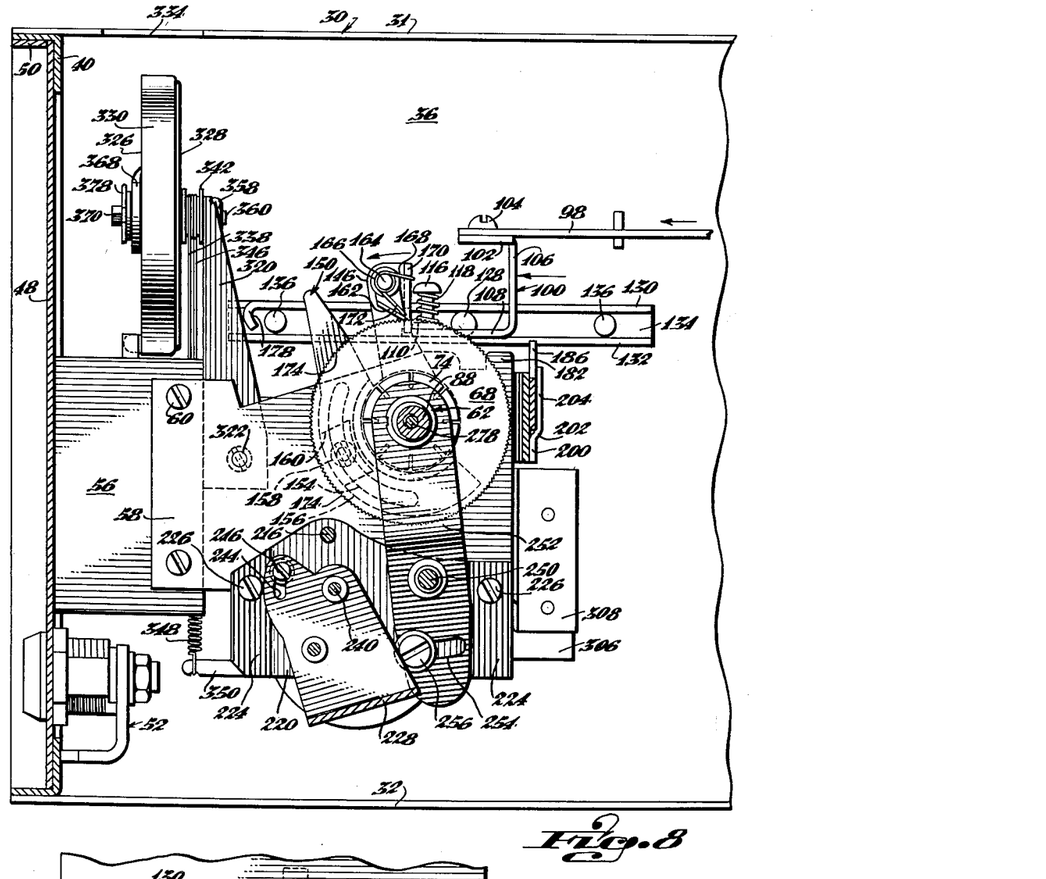
FIG. 8 is a longitudinal sectional view taken on line 8—8 of FIG. 4 and illustrating the first step in the cocking action imparted by the actuation of a coin slide to the control lever of the time control mechanism, incident to the insertion of a coin.

With particular reference to FIG. 7, an angle bracket 56 is rigidly fixed to door 48 as by spot welding, and in turn is fixed to the base plate 58 by means of screws 60. A hub 62 is rotatably journaled in a sleeve 64 turned outwardly from and formed integral with the base plate 58. The rotatable hub 62 is confined axially by a tapered head 66 overlying one face of the base plate 58 and a ratchet wheel 68 carried on a counterturned neck portion 70 of the hub 62. Ratchet wheel 68 abuts the outer end of journal sleeve 64 and is held under tension, against the end of the sleeve 64, by means of a spring washer 74, which is in turn confined against the ratchet wheel, by means of a split ring 76 carried in an annular groove 78 on the neck portion 70 of the hub 62. The ratchet wheel 68 is in driving connection with the hub 62 by means of a lug 80 struck outwardly from its inner periphery and extending into engagement with a keyway 82 formed in hub 62.

The hub 62 is internally screw threaded as at 84 and is adapted to engage the external threads 86 of an axially disposed threaded stud 88. The outer end of threaded stud 88 is provided with a head portion 90 which carries a gear 92 fixed thereto by means of swaging 94 and a pin 96. The drive connection to gear 92 and the purpose thereof will be more fully described hereinafter.

The coin slide indicated generally at 42 is of conventional construction and includes an inwardly projecting extension 98 which carries a downwardly projecting bracket indicated generally at 100. A horizontal arm 102 of bracket 100 is fixed to the inner extension 98 of coin slide 42 by means of screws 104. A vertical arm 106 extending downwardly from arm 102 carries a second horizontal arm 108 parallel with arm 102.

Toward its front edge the arm 108 of bracket 100 carries a spring loaded detent bar 110 positioned transversely thereof and pivoted on a pin 112 (FIG. 15) fixed to bracket arm 108 and extending upwardly through an aperture 114 in the detent bar 110 and terminating in an enlarged head portion 116. A compression spring 118 is positioned between the head 116 and the detent bar to firmly position the detent bar 110 in either of two positions determined by the pair of apertures 120 and 122 in the bracket arm 108 and the mating detent 124 in the detent bar 110. A second detent 126 may be provided in the detent bar 110 to provide a reduced friction bearing surface against the upper face of arm 108 when the bar 110 is pivoted from one position to the other.

The horizontal arm 108 of bracket 100 carries a pin 128 rigidly secured thereto as by welding and extending outwardly into engagement between the two webs 130 and 132 of a guide channel 134 rigidly fixed to one side wall 36 of the box 30 by means of rivets 136.

Thus, when a coin is inserted in the aperture 138 of coin slide 42 and injected into the box in the conventional manner, the inner end 98 of the coin slide carrying the bracket 100 moves in a longitudinal guided path by means of the cooperating guide pin 128 and guide channel 134.

Figure 4:
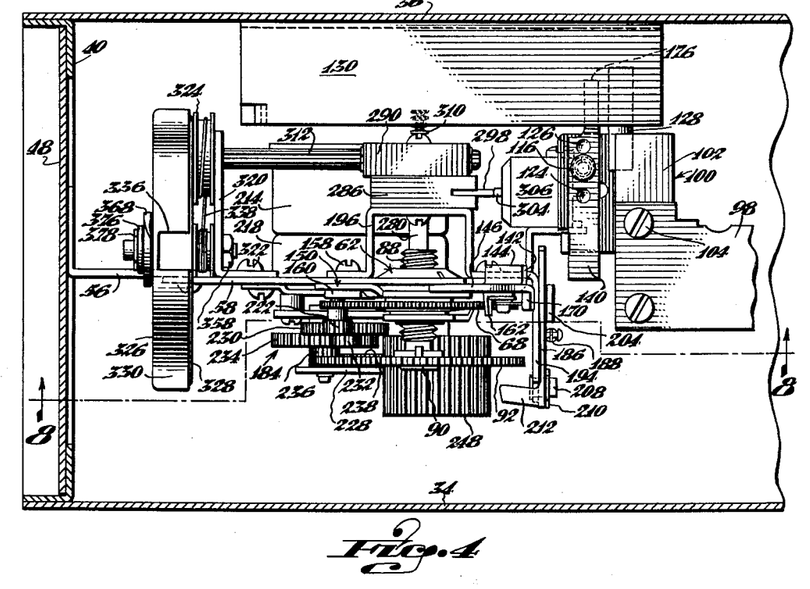
FIG. 4 is a sectional view taken on line 4—4 of FIG. 1 looking downwardly and illustrating a partial top plan view of the plus-minus mechanism of FIG. 3.
Figure 10:
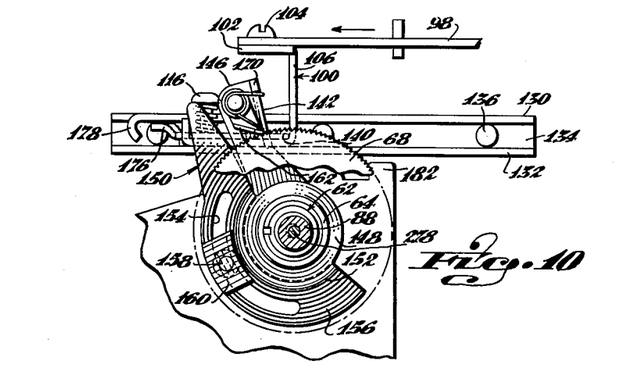
FIG. 10 is a fragmentary elevational view taken from FIG. 3, but illustrating the final step of the cocking action imparted by actuation of the coin slide.

With particular reference to FIGS. 3 and 4, it is readily apparent that this longitudinal path of travel enables an outwardly extending portion 140 of detent bar 110 to engage face 142 of an inwardly turned lug 144 of a control lever 146. Control lever 146 is rotatably journaled on the outer periphery of sleeve 64 (FIG. 7) and is confined in position by means of the hub portion 148 of an adjustable stop or limit arm 150. The hub portion 148 of arm 150 also encompasses the sleeve 64 and rotatably confines the control lever 146 between itself and the base plate 58. The limit arm 150 is turned inwardly from the hub portion 148 as at 152 to lie in the same vertical plane as the control lever 146, against the base plate 58. An arcuate slot 154 is provided in the flange 156 of the adjustable limit arm 150. A screw 158 passing through base plate 58 and arcuate slot 154 is adapted to receive a relatively flat arcuate nut 160 (FIG. 10) to rigidly hold the limit arm 150 in the desired position. This arcuate nut is preferably configurated to fit the contour of the inward turn 152 of the arm 150 to permit readjustment at any time with only a screw driver.

The upper end of control lever 146 carries a pawl 162 pivoted on a stud 164 fixed to and extending outwardly from the lever 146. A spring 166 carried on the stud 164 provides one leg 168 in engagement with an outwardly extending lug 170 of control lever 146 and the other leg 172 in engagement with the top face of the pawl 162 to hold the pawl in yieldable contact with the teeth 174 of ratchet wheel 68.

When a coin is injected into the box by means of the coin slide 42, the outwardly extending portion 140 of detent bar 110 engages face 142 of the inwardly turned lug 144 of the control lever 146 and pivots the lever about the sleeve 64 in a counter-clockwise direction until it strikes the adjustable limit arm 150. The pawl 162, being in yieldable engagement with the teeth 174 of ratchet wheel 68, is dragged over the teeth in this counter-clockwise movement without imparting movement to the ratchet wheel 68 due to the considerable drag or friction created by the spring washer 74 on the sleeve 64 through the ratchet wheel 68.

Figure 9:
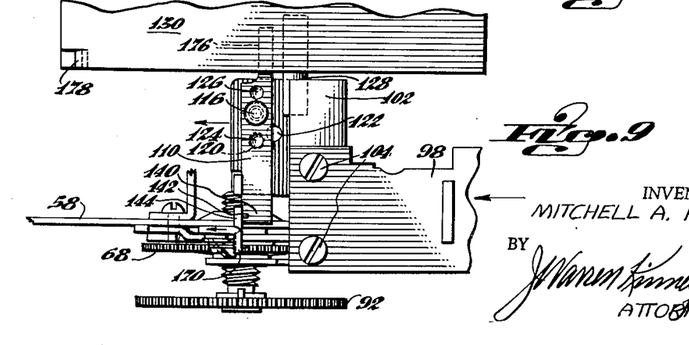
FIG. 9 is a fragmentary top plan view of FIG. 4, but illustrating the various parts in the position illustrated in FIG. 8.
Figure 11:
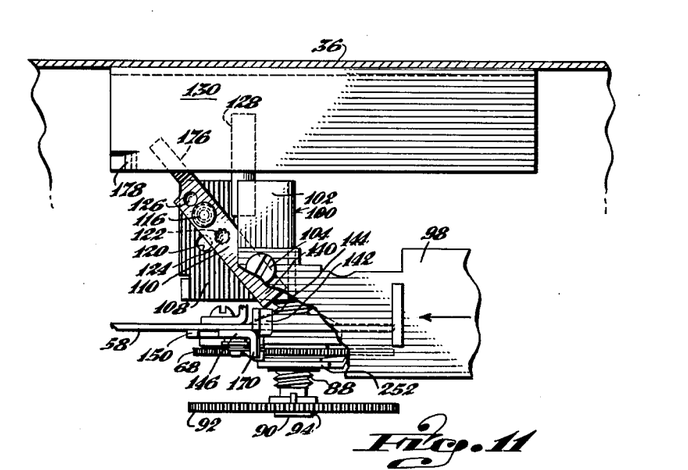
FIG. 11 is a fragmentary top plan similar to FIG. 9, but illustrating the various parts in the position shown in FIG. 10.

Up to this point, the spring loaded detent bar 110 remains in its transverse position with the detent 124 being securely seated in aperture 120 as best illustrated in FIG. 9. However, when the counter-clockwise movement of control lever 146 is arrested by engagement with the adjustable stop or limit arm 150 (FIGS. 10 and 11), continued inward movement of the coin slide will overcome the spring pressure on the detent bar 110 because of the engagement of its outer end 140 with the face 142 of lug 144. The detent bar 110 will pivot in a counter-clockwise direction as viewed in FIG. 11 and permit the outwardly extending portion 140 of the detent bar to clear and by-pass the face 142 of the lug 144. Detent 124 will engage aperture 122 and be firmly seated therein under pressure of spring 118 and the detent bar 110 will be firmly held in this position until the coin slide approaches the extremity of its inward movement.

A finger 176 extending inwardly from the detent bar 110 passes between the webs 130 and 132 of the guide channel 134 and is adapted to be engaged by a lug or hook 178 struck downwardly from the corner of web 130. The final inward movement of coin slide 42 enables the finger 176 to engage the hook 178 and cause the detent bar to assume its initial transverse position with detent 124 seated in aperture 120.

The return or outward stroke of the coin slide 42 (FIGS. 13 and 14) permits the outer portion 140 of the detent bar 110, which is braced against a lug 179 turned upwardly from the horizontal arm 108, to engage the rear face 180 of lug 144 and to pivot the control lever 146 in a clockwise direction. This clockwise movement is imparted to the ratchet wheel 68 by the engagement of the spring loaded pawl 162 with the ratchet teeth 174. A vertical stop ear 182 extends upwardly from the one corner of base plate 58 and extends into the plane of travel of lug 144 of the control lever 146 to form positive stop to arrest the clockwise rotational movement of the control lever 146.

Figures 13, 14, 15:
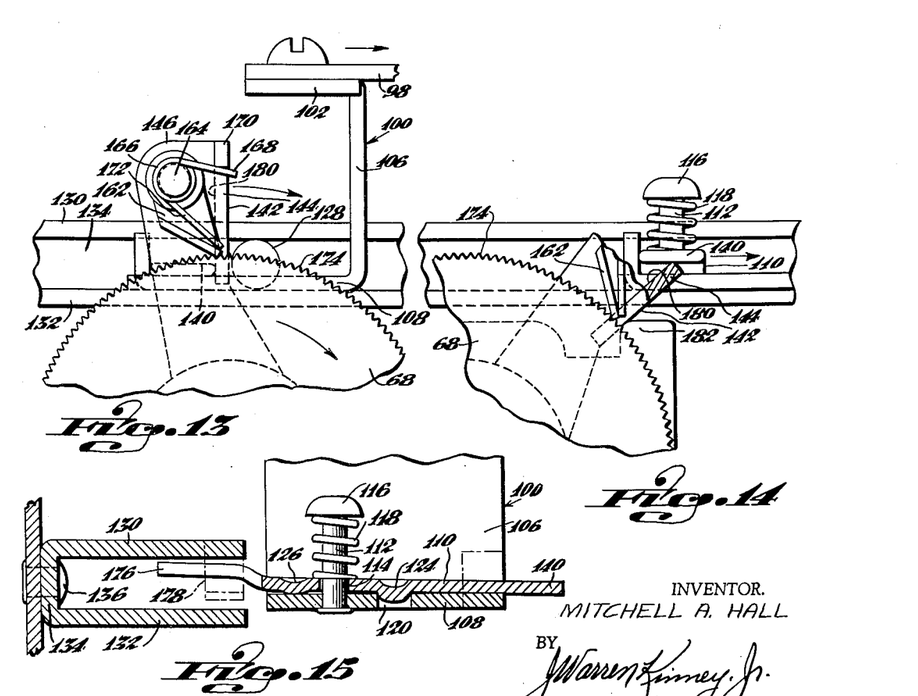
FIG. 13 is an enlarged fragmentary elevational view taken from FIG. 10, illustrating the start of the return stroke of the coin slide.
FIG. 14 is an enlarged fragmentary elevational view similar to FIG. 13, illustrating the return of the control lever to its starting position as illustrated in FIG. 3, and the final phase of the return stroke of the forward or inner end of the coin slide.
FIG. 15 is a cross-sectional view taken on line 15—15 of FIG. 12 illustrating a detail of the control lever actuating bar.

With particular reference to FIG. 14, the control lever 146, having its clockwise rotational movement arrested by contact with stop ear 182, is positioned to allow the extension 140 of detent bar 110 to be cammed upwardly over the inclined face 180 of lug 144. The coin slide is then returned to its fully extended position and the detent bar 110 assumes its at-rest position as in FIG. 4, in readiness for the start of another cycle.

The clockwise rotation imparted to sprocket wheel 68 by the return or outward stroke of the coin slide 42 is, in turn, imparted to the hub 62 by means of the lug 80 struck inwardly to engage the keyway 82. Rotation of hub 62 causes relative axial movement of the threaded stud 88 by means of the engagement of the internal threads 84 of the hub 62 and the external threads 86 of the stud 88. A gear train, indicated generally at 90, in driving connection with the large gear 92 carried by the externally threaded stud 88, precludes rotational movement being imparted to the stud 88 by the ratchet wheel 68. Therefore, clockwise rotation of ratchet wheel 68 imparts on outward axial movement to the threaded stud 88 and large gear 92.

Continued operation of the coin slide 42 causes the gear 92 to move outwardly to a position indicated by 92+ in dot-dash lines in FIG. 7. Limit means are provided in the form of a pivoted lever 186 (FIGS. 7, 19 and 20), normally held downwardly in the position illustrated in FIG. 19, by means of the tension spring 188 having one end carried by a headed pin 190 fixed to the lever 186 and its other end carried by a similar pin 192 fixed to a forwardly projecting extension 194 of a bracket 196 fixed to the base plate 58 by means of the screws 158 and 198. The spring 188 holds the pivoted lever 186 in sliding engagement with a cradle bracket 200 fixed to the bracket extension 194 as by welding. The cradle bracket is turned outwardly to provide an abutment 202 for the bottom of the lever 186 and an upper portion 204 spaced from the face of bracket extension 194 to loosely embrace the two sides of the lever 186 between the bracket extension 194 and the upper portion 204 of the bracket 200.

The lever 186 is pivotally attached to an ear 206 of bracket extension 194 by means of a pin 208 and is held in place on the pin by a snap clip 210. An ear 212 turned over from the top of the forward end of lever 186, adjacent the pivot pin, extends outwardly in the path of travel of large gear 92 as it moves to the position indicated at 92+ in dot-dash lines.

Figures 18, 19, 20:
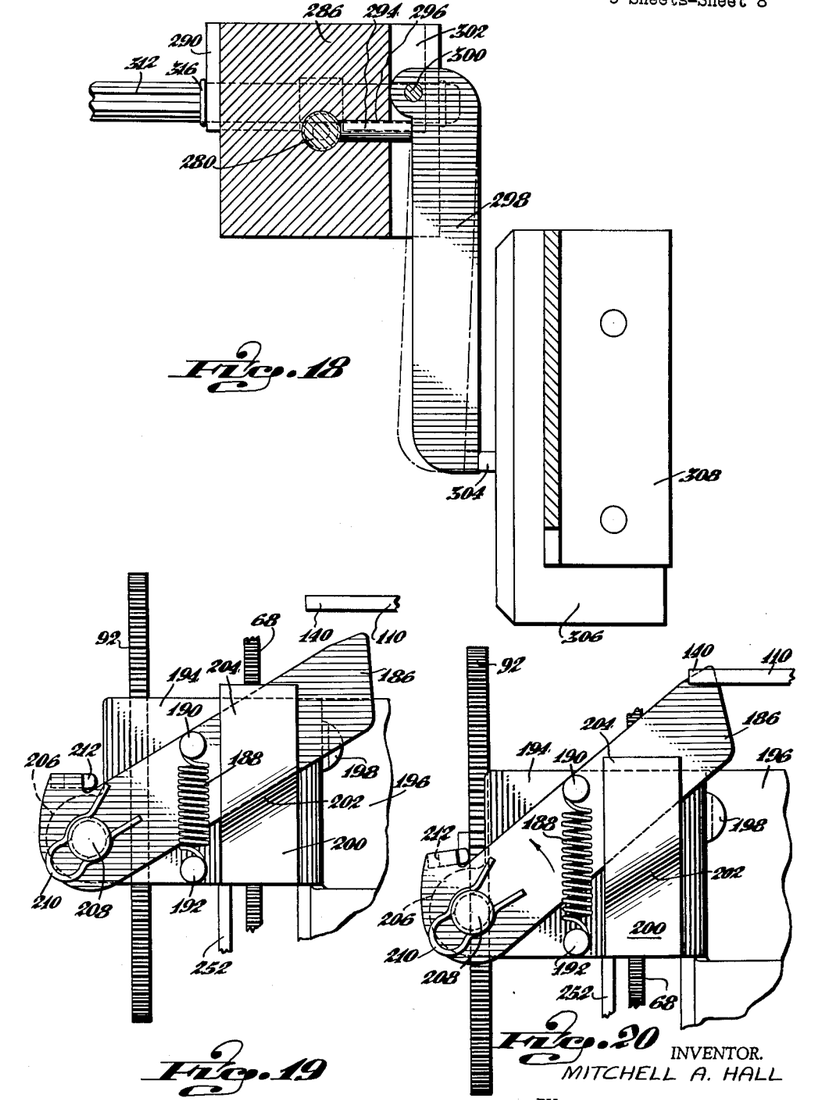
FIG. 18 is a longitudinal sectional view taken on line 18—18 of FIG. 7.
FIG. 19 is an elevational view of the limit mechanism that renders continued operation of the coin slide inoperative when or if the limit has been reached in the plus accumulation of time.
FIG. 20 is an elevational view similar to FIG. 19, illustrating the parts in position assumed when the limit has been reached in the plus accumulation of time.

With particular reference to FIG. 20, the gear 92 is illustrated in its outer or fully extended position. The outer face of gear 92 has contacted the turned over ear 212, causing the pivoted lever to swing upwardly to intercept the outwardly extending portion 140 of the detent bar 110, as the coin slide 42 is moved inwardly. Contact with the lever 186 causes the detent bar 110 to be displaced from its normally transverse position to the position illustrated in FIG. 11 before it reaches the lug 144 of control lever 146.

Figure 12:
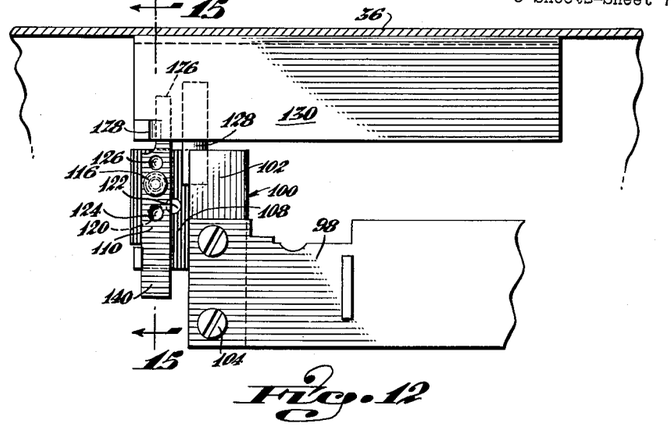
FIG. 12 is a fragmentary top plan view taken from FIG. 11, illustrating the arrangement of parts on the inner end of the coin slide at the termination of the inward stroke of the slide.

The detent bar 110 by-passes the lug 144 of control lever 146 and upon reaching the end of its inward stroke, the detent bar 110 is swung back to its transverse position (FIG. 12). Subsequent outward movement of the coin slide 42 imparts no clockwise movement to the control lever 146 as it was not cocked by the inward movement of the coin slide and the detent bar 110 simply passes over the lug 144 as in FIG. 14 and returns to its start or at-rest position. Thus, when the gear 92 and threaded stud 88 has been threaded axially outwardly to its predetermined limit, any subsequent operations of the coin slide make no contact with the control lever 146 until the gear 92 and threaded stud 88 have moved inwardly sufficiently to allow the pivoted lever 186 to drop downwardly out of the path of detent bar 110.

A synchronous motor 214 drives an output shaft 216 through a speed reducer 218. Speed reducer 218 and motor 214 are carried on the back side of base plate 58 and output shaft extends through base plate 58 and a bridge plate 220 to carry a driving pinion 222 in mesh with the gear train 184 which transmits the drive to the large gear 92.

Figure 5:
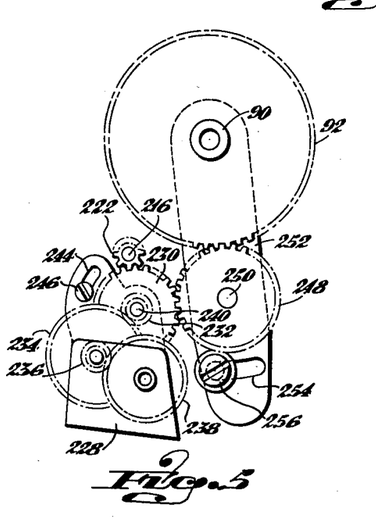
FIGS. 5 and 6 are diagrammatic elevational views of various gear train combinations illustrating the manner in which the unit timing cycles may be varied to meet the particular conditions of a given installation.
Figure 6:
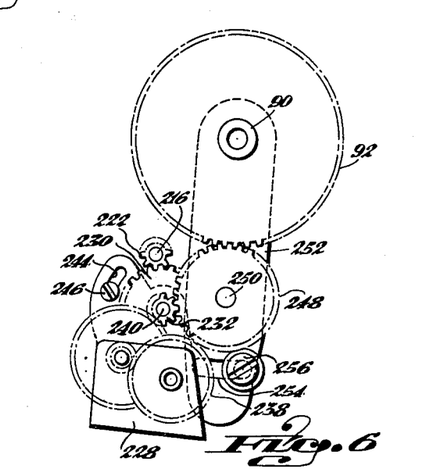

The bridge plate 220 (FIG. 16) is spaced from the base plate 58 and is provided with two inwardly turned feet 224 fixed to the base plate 58 by means of screws 226 and is particularly adapted to carry an adjustable pivotal bracket 228 which carries the gears 230, 232, 234, 236 and 238. The gear cluster 230 and 232 are carried on a shaft 240 which is mounted in a boss 242 carried by the bridge plate 220. Shaft 240 also acts as a pivot for the pivotal bracket 228. An arcuate slot 244 in the pivotal bracket 228 cooperates with a set screw 246 to allow the gear 238 to be swung out of mesh with an elongated adjustable idler gear 248 as best illustrated in FIGS. 5 and 6.

The idler gear 248 is adjustably mounted on a stub shaft 250 carried by a pivot arm 252. At its upper end, the arm 252 is pivoted on the counterturned neck portion 70 of hub 62 and is provided with an arcuate slot 254 at its lower end, traversed by a set screw 256 threaded through the slot 254 into the bridge plate 220. Thus the elongated idler gear can be swung to one position where it can be meshed with either gear 238 (FIG. 3) or gear 230 (FIG. 5), or a second position where it meshes with pinion gear 232 (FIG. 6).

Figure 16:
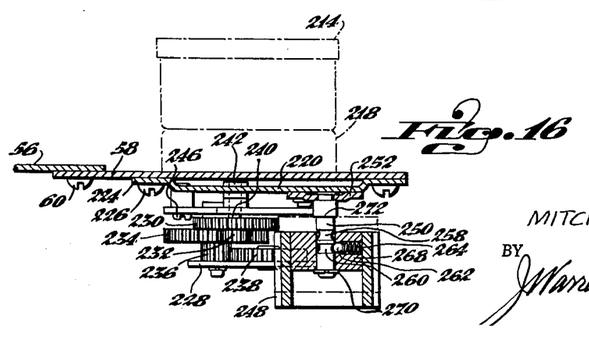
FIG. 16 is a longitudinal sectional view taken on lines 16—16 of FIG. 3.

Referring particularly to FIG. 16, the elongated idler gear 248 is adjustable inwardly to mesh with gear 230, or outwardly to mesh with gear 238. The stub shaft 250 is provided with a pair of annular grooves 258 and 260 to cooperate with a detent ball 262 and spring 264, carried in an appropriate bore 266 in the core 268 of idler gear 248, to provide for the inward and outward adjustment. A split ring 269 is provided on the outer end of stub shaft 250 to limit the outward movement of the idler gear 248 and a shoulder 272 limits its inward movement.

As illustrated in FIG. 3, the large gear 92 is driven in a clockwise direction through the entire gear train, from drive pinion 222 to gear 230, pinion 232 to gear 234, pinion 236 to gear 238 to adjustable idler 248 to the large gear 92. With this driving arrangement the slowest drive speed will be transmitted to the gear 92.

With particular reference to FIG. 6, an intermediate speed is transmitted to the gear 92, by adjusting or moving the pivotal bracket in a clockwise direction to disengage gear 238 from its driving connection with idler 248, and swinging pivot arm 252 in a clockwise direction to engage idler 248 with pinion 232. The large gear is now driven in a clockwise direction from drive pinion 222 to gear 230, pinion 232 to idler 248 to large gear 92.

With particular reference to FIG. 5, a fast speed is transmitted to the gear 92 by swinging the pivot arm 252 in a counter-clockwise direction and by snapping the elongated idler gear 248 inwardly until the detent ball 266 engages the annular groove 250 to enable idler 248 to mesh with gear 230. The large gear 92 is now driven in a clockwise direction from drive pinion 222 to gear 230, to idler 248 to gear 92.

Clockwise rotation of the large gear 92 fixed to the threaded stud 88 permits the stud 88 to be threaded axially inwardly through the internally screw threaded hub 62 which is held against relative rotation by means of the spring washer 74 as previously described. The threaded stud can be driven inwardly until the large gear 92 reaches a position indicated in dot-dash lines as 92— in FIG. 7.

The threaded stud 88 is internally bored as at 274 and is provided with an internally threaded portion 276 to adjustably engage the externally threaded portion 278 of an axially disposed shaft or rod 280. The shaft or rod 280 extends outwardly from the threaded stud 88 and passes through an aperture 282 in the bracket 196, an aperture 284 in a block 286 and an aperture 288 in a block 290.

A shoulder 292 on rod 280 is adapted to engage a transverse shift pin 294 disposed in an appropriate bore 296 in block 286.

Referring particularly to FIG. 18, a switch actuating lever 298 is pivoted on a pin 300, carried in block 286, and is disposed vertically downwardly through a slot 302 in block 286 to engage the button 304 of a micro-switch 306. Micro-switch 306 is carried by an arm 308 of bracket 196.

Inward movement of the threaded stud 88 carrying the large gear 92 will therefore cause the shoulder 292 of rod 280 to engage the shift pin 294, moving it outwardly to cause the switch actuating lever 298 to depress the button 304 to disengage the contacts of the normally On micro-switch.

The shoulder 292 is initially axially adjusted, by means of the threaded portion 278 of rod 280 traversing the internal threads 276 of stud 88, to actuate the switch button 304 to its Off position midway of the axial travel or movement of the gear 92 from the phantom position 92+ to the position 92—.

When the gear 92 moves outwardly to the phantom position indicated at 92+, the bottom of the switch actuating lever 298 moves away from the micro-switch 306 to permit the switch to assume its normally On position.

Outwardly beyond the shoulder 292, the shaft or rod 280 is provided with a series of annulations 310 adapted to mesh with a transversely disposed toothed or splined shaft 312. Inward or outward movement of the rod 280 will therefore impart relative rotation to the toothed or splined shaft 312 which is rotatably journaled in block 290 and confined in place axially by means of a pair of split rings 314 and 316 disposed in appropriate annular grooves 318 at both ends of the block 290.

Figure 24:
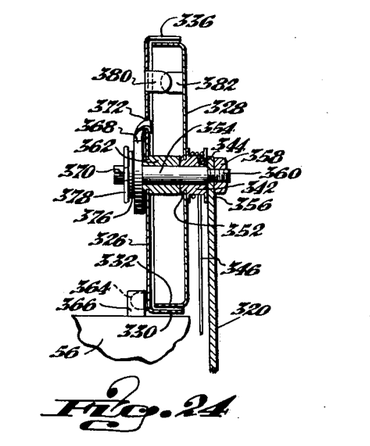
FIG. 24 is a vertical sectional view taken on line 24—24 of FIG. 21.

The shaft 312 extends forwardly from the block 290 and extends through and is journaled in a vertically disposed angle bracket 320, mounted on the base plate 58 by means of a screw 322. A pulley 324 is press fitted on the forward end of shaft 312, adjacent the angle bracket 320. This pulley 324 is adapted to control the pair of dials 326 and 328 which carry appropriate indicia on their outer turned over annular flanges 330 and 332. The annular flange 330 is turned over from dial 326 as best illustrated in FIG. 24. The dial 328 is somewhat smaller in diameter than dial 326 and is provided with an annular flange 332 turned over in a direction opposed to flange 330 and nested within the larger dial 326 and flange 330.

Figure 21:
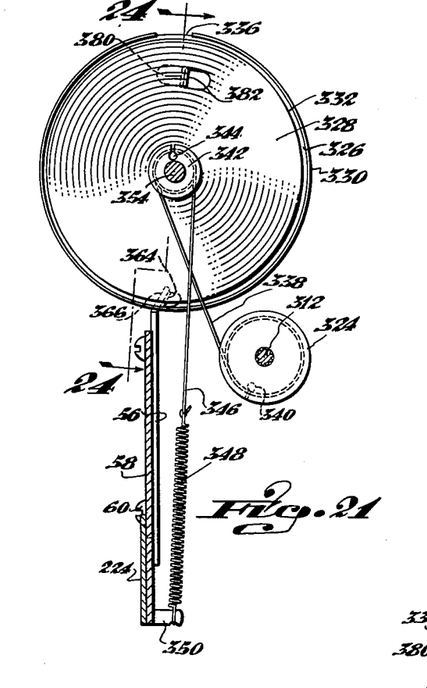
FIG. 21 is a vertical sectional view taken on line 21—21 of FIG. 3 illustrating the indicator dials that provide visual means on which the amounts of plus or minus accumulation of time is indicated.

An opening 334 is provided in the top 31 of the box 30 adjacent to the top of the nested dials 326 and 328 to enable the operator to readily note the indicia thereon. A relatively small segment of the outer flange 330 is cut away as at 336 to enable the operator to see the indicia on the top of the inner dial 328 when the outer dial 326 is in the position illustrated in FIGS. 21 and 22.

An elongate flexible member such as, by way of example, a string 338 is passed around the pulley 324 and attached thereto as at 340 and extends upwardly and around a second pulley 342 to which it is attached as at 344. Pulley 342 also carries a second elongate flexible member or string 346, which is wound thereabout, and attached thereto in the same manner as string 338.

String 346 extends downwardly and is attached to one end of an elongated tension spring 348, which in turn is attached at its other end to an ear 350 extending outwardly from a corner of the base plate 58.

Figure 22:
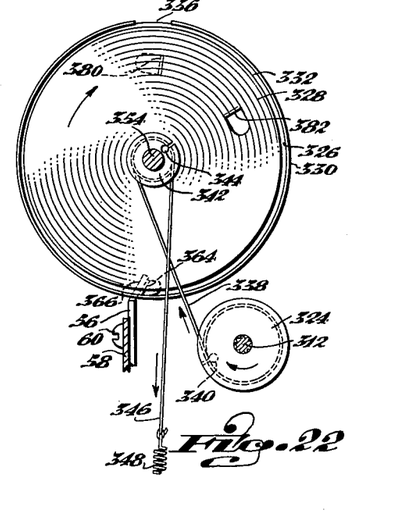
FIG. 22 is a vertical sectional view similar to FIG. 21, illustrating the operation of the innermost dial upon which the plus accumulation of time is indicated.
Figure 23:
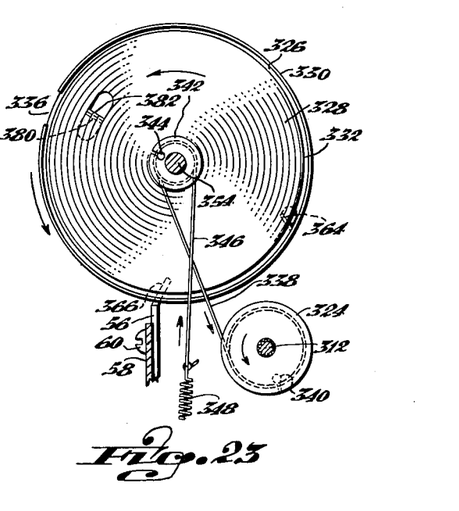
FIG. 23 is a view similar to FIG. 21, illustrating the operation of the outer dial upon which the minus accumulation of time is indicated.

When the large gear 92 moves outwardly from the position illustrated in full lines in FIG. 7 to the phantom position 92+, the shoulder 292 of rod 280 disengages the shift pin 294 and permits the switch actuating lever 298 to swing away from the micro-switch 306 to permit the switch to assume its normally On position. At the same time the series of annulations 310, meshing with the toothed or splined shaft 312, imparts a clockwise rotation to the shaft 312 and pulley 324 (FIG. 22).

The clockwise rotation of pulley 324 unwinds the string 338 which is kept taut by the downward pull of the tension spring 348 on string 346. Therefore, the second pulley 342 is also rotated in a clockwise direction in direct proportion to the amount of string 338 freed from the pulley 324 by the clockwise rotation of said pulley. As the pulley 342 is rigidly fixed to the inner dial 328 as by the swaged over hub 352, the dial 328 is rotated in a clockwise direction with pulley 342.

Hub 352 is journaled on a stub shaft 354 rigidly fixed to the upper end 356 of angle bracket 320 by means of a nut 358 threaded on the counterturned threaded stud 360.

The critical point of making or breaking contact of the switch 306 is illustrated in FIG. 7. The shoulder 292 is barely in contact with the shift pin 294 to hold the switch in Off position. Any outward movement of rod 280 and gear 92 will permit the switch to assume its normally On position. The amount of outward movement of the gear 92 is proportionately transmitted to the inner dial 328 by means of the meshing of annulations 310 with the toothed or splined shaft 312 as just described. Therefore, indicia in the form of predetermined graduations on the outer periphery of the inner flange 332 can be observed by the operator through aperture 334 in the housing 30 and the cutaway 336 in the outer flange 332. A direct reading can be provided to allow the operator to know exactly how long the switch will be in its On position.

The larger dial 326 is carried by a lug 362 journaled on the stub shaft 354 and is provided with a lug 364 struck outwardly from the face thereof, adjacent the flange 330, and adapted to engage an upstanding lug 366 integral with the top of angle bracket 56. The lug 364 is normally held against the upstanding lug 366 by means of a spring 368 having its inner end rigidly held in a slot 370 of stub shaft 354 and its outer end extending through an aperture 372 in the face of the dial 326 and turned over as at 374. A washer 376 and a snap clip 378 are provided on the outer end of stub shaft 354 to maintain the nested dial assembly and spring 368 in place.

A pair of lugs 380 struck inwardly from the face of dial 326, and 382 struck inwardly from dial 328, are of sufficient length to overlap and provide contact between the dials 326 and 328. When the mechanism is in the critical make or break position as described in connection with FIG. 7, the nested dials are in the position illustrated in FIG. 21 with the lugs 380 and 382 lying closely adjacent each other. As the inner or smaller dial 328 is actuated in a clockwise direction (FIG. 22) to register the amount of On time, as previously described, the lug 382 moves away from the lug 380.

When the synchronous motor 214 drives the gear 92 inwardly from the phantom position 92+, by means of any of the various gear train drives previously described, the inward travel of the shaft or rod 280 and the annulations 310 impart a counter-clockwise rotation to the pulleys 324 and 344. As the shoulder 292 makes contact with the shift pin 294 to break the contacts of switch 306, and gear 92 moves toward the phantom position 92—, the lug 382 is adapted to engage the lug 380 to rotate the larger dial 326, in a counter-clockwise direction. Therefore, indicia on the outer periphery of flange 330 will pass under the window or aperture 334 to permit the operator to know how long the switch has been in its off position.

If it is likely that the timing may be readjusted periodically by changing the gear drive train as previously described, it may be desirable to provide the outer peripheries of the flanges with different colors instead of indicia calibrated to the speed of the gear drive train. White could be applied to the flange 332 and red to the flange 330 for instance. In this event the operator knows the switch was On as long as the white is visible and Off as long as the red is visible.

The plus or minus time control mechanism may be connected in circuit with an electric appliance, electrically controlled machinery, or any type of electric equipment. The synchronous motor 214 is wired to run continuously, while the micro-switch is wired in series with the main stop, start control of the appliance, etc. that it is to control. It is a principal purpose of the present invention to provide a means for collecting rent, for the use of an appliance or as a pay-as-you-go means of purchasing an appliance, etc. In other words, an electric appliance, etc. may be installed in a purchaser's home or place of business, and the plus or minus time control mechanism will provide a definite period of usage for a pre-determined amount of money.

One or more coins may be injected into the housing 30 by means of the coin slide 42 and each coin allows said coin slide to cock the control lever 146 and operate the pawl and ratchet on its return stroke to provide a definite amount of outward movement of the large gear 92 and switch actuating shoulder 272, toward the phantom position 92+. The more coins injected into the box 30, the more time will be accumulated on the plus side of the critical point illustrated in FIG. 7.

Figure 17:
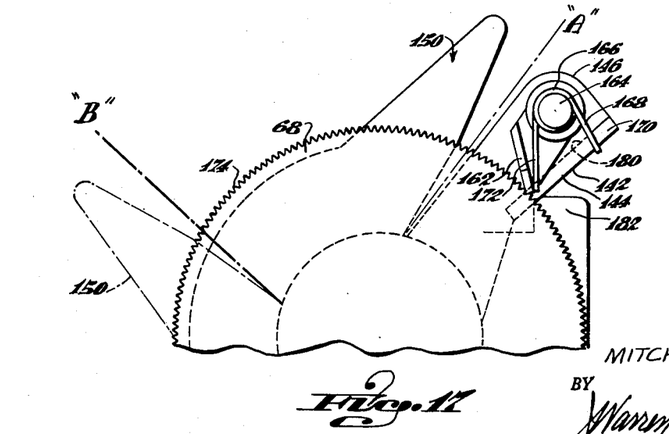
FIG. 17 is a diagrammatic view illustrating two positions of the stop mechanism for the time control pawl and ratchet.

The actual time accumulated by each coin depends upon the setting of the limit arm 150 which controls the number of ratchet teeth 174 traversed by the pawl during the cocking of control lever 146 and subsequently rotated clockwisely by the pawl 162. Referring to FIG. 17, it can be seen that the limit arm 150 can be adjusted to permit the control lever to move, for example, to a position indicated by a broken line "A", or to broken line "B". When the adjustable limit arm 150 is positioned to arrest the cocking movement of the control lever 146 at line "A", the clockwise movement imparted to the ratchet wheel 68 by the pawl 162 will be equivalent to the length of one tooth 174. However, when the adjustable limit arm 150 is positioned to arrest the cocking movement of the control lever 146 at line "B", the clockwise movement imparted to the ratchet wheel by the pawl 162 will be about forty-five teeth.

The present invention is not limited to the provision of any basic time interval or intervals to be provided by the clockwise movement of one or more teeth, because it is readily apparent that said interval or intervals over an extremely wide range can be provided for by varying the size of the ratchet teeth 174, or ratchet wheel 68, as well as the size or arrangement of other parts.

Strictly as an example, however, with the motor 214 driving through the speed reducer 218 and the gear train as illustrated in FIG. 5, the large gear 92 may be driven at a speed which will thread the stud 88 inwardly, in three minutes' time, the exact distance to compensate for the outward movement imparted to the stud 88 by the clockwise rotation of ratchet wheel 68, a distance equivalent to the length of one tooth 184. If the adjustable limit arm 150 is arranged to allow the clockwise rotation of ratchet wheel 68, a distance equivalent to the length of one tooth with the injection of each coin, three minutes of time are accumulated on the plus side for each coin injected. This represents the fast speed.

If the intermediate speed, illustrated in FIG. 6, is used, an additional four to one speed reduction is provided. Therefore, for each coin injected a twelve minute period of time would be accumulated for the clockwise rotation of ratchet wheel 68, a distance equivalent to the length of one tooth.

When the slow speed, FIG. 3, is used, an additional five to one speed reduction is provided. For each coin injected sixty minutes or one hour of time would be accumulated for the clockwise rotation of ratchet wheel 68, a distance equivalent to the length of one tooth.

If the adjustable limit arm 150 is regulated to permit the movement of the ratchet wheel 68, a distance equivalent to the length of a plurality of teeth 174, the time accumulation for each coin will amount to the number of teeth multiplied by three minutes, twelve minutes, or one hour, depending on the gear train in use. It is therefore apparent that a time range from three minutes to two or three days for each coin injected, may be provided for, by the various adjustments.

As previously stated, the speeds and time intervals may vary greatly and are not intended to be limited by the examples given.

When sufficient coins are injected into the box, the large gear 92 will move outwardly to the phantom position 92+ which may build up an accumulation of, for instance, ten days of time, during which the switch 306 is in On position. This plus accumulation of time is visibly recorded on the dial 328. As previously stated, the synchronous motor is constantly energized, and will begin to drive the large gear 92 and consequently the switch actuating shoulder 292 inwardly. When the time accumulation of ten days has expired, the gear 92 and shoulder 292 will have moved inwardly to the position illustrated in FIG. 7, and the switch 306 will be actuated to its Off position by the shift pin 294.

If the operator fails to inject another coin into the box 30, the switch 306 remains Off, and the gear 92 moves toward the phantom 92— position. A minus accumulation of time is built up and visibly recorded on the dial 330. Before the switch 306 can be returned to its On position, the operator must insert a sufficient number of coins to account for the minus accumulation of time. When the minus accumulation of time is accounted for to return the switch to its On position, the operator may then continue to inject coins until any desired plus accumulation of time is attained.

What is claimed is:

1. A plus-minus timer incluing an actuator selectively movable in opposite directions toward, through and beyond a neutral position, means normally and continuously imparting movement to said actuator in one direction, and other means for imparting an intermittent movement to said actuator in the opposite direction only.

2. A plus-minus timer comprising, in combination, circuit control means operable to open and close an electrical circuit, an actuator movable in opposite directions toward, through and beyond a neutral position, said actuator when on one side of said neutral position actuating said circuit control means to close an electrical circuit, and when on the other side of said neutral position actuating said circuit control means to open the electrical circuit, means normally and continuously imparting a circuit opening movement to said actuator, and other means intermittently operable for imparting a circuit closing movement to said actuator.

3. A plus-minus timer including an actuator selectively movable in opposite directions toward, through and beyond a neutral position, means normally and continuously imparting movement to said actuator in one direction, other means for imparting an intermittent movement to said actuator in the opposite direction only, and means indicating the location of said actuator relative to said neutral position.

4. A plus-minus timer comprising, in combination, circuit control means operable to open and close an electrical circuit, an actuator movable in opposite directions from a plus position on one side of a neutral position to a minus position on the opposite side thereof, said actuator when on one side of said neutral in a plus position actuating said circuit control means to close an electrical circuit, and when on the other side of said neutral in a minus position actuating said circuit control means to open the electrical circuit, means normally and continuously imparting movement to said actuator toward said minus position, and other means intermittently operable for imparting movement to said actuator toward said plus position.

5. A plus-minus timer comprising, in combination, circuit control means operable to open and close an electrical circuit, an actuator movable in opposite directions from a plus position on one side of a neutral position to a minus position on the opposite side thereof, said actuator when on one side of said neutral in a plus position actuating said circuit control means to close an electrical circuit, and when on the other side of said neutral in a minus position actuating said circuit control means to open the electrical circuit, means normally and continuously imparting movement to said actuator toward said minus position, other means intermittently operable for imparting movement to said actuator toward said plus position, and means indicating the relative plus or minus location of said actuator with reference to said neutral position.

6. A plus-minus timer comprising, in combination, circuit control means operable to open and close an electrical circuit, an actuator movable axially in opposite directions from a plus position on one side of a neutral position to a minus position on the opposite side thereof, said actuator when in a plus position actuating said circuit control means to close an electrical circuit, and when in a minus position actuating said circuit control means to open an electrical circuit, means including an electric motor normally and continuously imparting endwise movement to said actuator toward said minus position, and other means including a manually operable coin controlled member intermittently operable for imparting endwise movement to said actuator toward said plus position.

7. A plus-minus timer comprising, in combination, circuit control means operable to open and close an electrical circuit, an actuator movable axially in opposite directions from a plus position on one side of a neutral position to a minus position on the opposite side thereof, said actuator when in a plus position actuating said circuit control means to close an electrical circuit, and when in a minus position actuating said circuit control means to open the electrical circuit, means including an electric motor normally and continuously imparting endwise movement to said actuator toward said minus position, other means including a manually operable coin-controlled member for imparting endwise movement to said actuator toward said plus position, and means indicating the relative plus or minus location of said actuator with reference to said neutral position.

8. A timer including an actuator selectively movable in opposite directions toward, through and beyond a neutral position, means including an electric motor normally and continuously imparting movement to said actuator in one direction, other means including a manually operated coin-controlled member for moving said actuator in the opposite direction, and means rendering said manually operated member ineffective for moving said actuator beyond a predetermined setting.

9. A plus-minus timer comprising, in combination, circuit control means operable to open and close an electrical circuit, a rotatable actuator movable axially in opposite directions from a plus position on one side of a neutral position to a minus position on the opposite side thereof, said actuator when in a plus position actuating said circuit control means to close an electrical circuit, and when in a minus position actuating said circuit control means to open an electrical circuit, means including an electric motor normally and continuously rotating said actuator for imparting endwise movement thereto toward said minus position, other means including a ratchet wheel, a ratchet, and a manually operable coin controlled member for actuating said ratchet to rotate said ratchet wheel for imparting endwise axial movement to said actuator away from said minus position and toward said plus position, and stop means actuated by said actuator when shifted to the limit of its plus position for rendering ineffective further operation of said manually operable coin controlled member.

10. A plus-minus timer including an actuator axially movable in opposite directions toward, through and beyond a neutral position, and indicator means in driven relationship with said acutator, said means indicating the relationship of said actuator with reference to said neutral position.

11. A plus-minus timer comprising, in combination, circuit control means for opening and closing an electrical circuit, a coin-controlled slide member shiftable between fully retracted and fully advanced positions, an actuator axially shiftable from a plus position on one side of a neutral position to a minus position on the opposite side thereof, said actuator controlling the operating characteristics of said control circuit means, means including a ratchet wheel mounted for rotation about, but fixed against endwise movement along the axis of said actuator for imparting endwise axial movement to said actuator toward said plus position, a detent arm pivotally secured to and carried by said slide for movement between a cocked position projecting transversely from the slide and an uncocked position in retracted relationship with said slide, means normally and yieldably disposing said detent arm in cocked position when said slide is in fully retracted positions whereby said arm will engage said ratchet means for advancing said ratchet means relative to said ratchet wheel incident to movement of said slide from retracted to advanced position, said detent arm being shifted to an uncocked position incident to further movement of the slide toward its advanced position after said ratchet means has been fully advanced relative to said ratchet wheel, means engageable by said arm when said slide has been fully advanced to shift said arm from uncocked to cocked position, said arm, upon retraction of said slide, adapted to engage and advance the ratchet means in driving relationship with said ratchet wheel, and means disengaging said arm from said ratchet means at the end of said ratchet wheel-actuating stroke while maintaining said arm in cocked position.

12. A plus-minus timer comprising, in combination, circuit control means for opening and closing an electrical circuit, a coin-controlled slide member shiftable between fully retracted and fully advanced positions, an actuator axially shiftable from a plus position on one side of a neutral position to a minus psition on the opposite side thereof, said actuator controlling the operating characteristics of said control circuit means, first means including a ratchet wheel mounted for rotation about, but fixed against endwise movement along the axis of said actuator for imparting endwise axial movement to said actuator toward said plus position, second means in driven relationship with said actuator, said second means including a gear rotatable about and shiftable endwise along the axis of said first means for imparting endwise movement to said actuator toward said minus position, means interconnecting said first and second means whereby rotation of said ratchet wheel will impart endwise axial movement to said gear away from said ratchet wheel, means operable for imparting a step-by-step rotary motion to said ratchet wheel, a detent arm pivotally secured to and carried by said slide for movement between a cocked position projecting transversely from the slide and an uncocked position in retracted relationship with said slide, means normally and yieldably disposing said detent arm in cocked position when said slide is in fully retracted positions whereby said arm will engage said ratchet means for advancing said ratchet means relative to said ratchet wheel incident to movement of said slide from retracted to advanced position, said detent arm being shifted to an uncocked position incident to further movement of the slide toward its advanced position after said ratchet means has been fully advanced relative to said ratchet wheel, means engageable by said arm when said slide has been fully advanced to shift said arm from uncocked to cocked position, said arm, upon retraction of said slide, adapted to engage and advance the ratchet means in driving relationship with said ratchet wheel, and means disengaging said arm from said ratchet means at the end of said ratchet wheel-actuating stroke while maintaining said arm in cocked position, means imparting axial movement to said gear away from said ratchet wheel incident to actuation of said ratchet wheel, an abutment member pivotally mounted for movement between lowered and raised positions relative to said ratchet means, means including a member engageable by said gear when said actuator member has been shifted to its maximum plus position for elevating said abutment into the path of said detent arm for shifting said arm from cocked to uncocked position incident to movement of said slide from retracted to advanced positions, thereby rendering said detent arm ineffective to actuate said ratchet means.

13. A plus-minus timer including an actuator selectively movable from a minus position toward and through a neutral position to a plus position and vice versa, means normally and continuously imparting movement to said actuator in the direction of the minus position, and other means for imparting an intermittent movement to said actuator toward the plus position.

14. A plus-minus timer including a rotatable actuator selectively axially movable in opposite directions relative to a plus and a minus position and passing in so moving through a neutral position to one or the other of said plus or minus positions, means operatively connected with said actuator continuously moving the latter toward the minus position, and other means for imparting an intermittent movement to the actuator in the direction of the plus position.

15. The invention according to claim 14, with means actuated by the actuator for indicating the location of the actuator relative to said neutral position.

References Cited in the file of this patent

UNITED STATES PATENTS

| 1,992,198 | Dushane | Feb. 26, 1935 |
| 2,081,311 | Thompson | May 25, 1937 |
| 2,458,853 | Hughes | Jan. 11, 1949 |
| 2,483,831 | Illian | Oct. 4, 1949 |
| 2,814,682 | Russell | Nov. 26, 1957 |

FOREIGN PATENTS

| 472,597 | Great Britain | Sept. 21, 1937 |